United States Patent [19]
Powers

[11] Patent Number: 5,394,175
[45] Date of Patent: Feb. 28, 1995

[54] TRANSVERSE IMAGE REGISTRATION FOR A DIGITAL COLOR PRINTER

[75] Inventor: Edward A. Powers, Penfield, N.Y.

[73] Assignee: Xerox Corporation, Stamford, Conn.

[21] Appl. No.: 240,195

[22] Filed: May 9, 1994

Related U.S. Application Data

[63] Continuation of Ser. No. 995,650, Dec. 18, 1992.

[51] Int. Cl.⁶ .......................................... G01D 15/06
[52] U.S. Cl. ...................................................... 347/116
[58] Field of Search .................. 346/107 R, 108, 157, 346/160

[56] References Cited

U.S. PATENT DOCUMENTS

| | | | |
|---|---|---|---|
| 4,386,272 | 5/1983 | Check, Jr. et al. | 346/108 X |
| 4,893,135 | 1/1990 | Jamzadeh | 346/108 |
| 4,912,491 | 3/1990 | Hoshino et al. | 346/160 |
| 4,961,089 | 10/1990 | Jamzadeh | 355/207 |
| 4,965,597 | 10/1990 | Ohigashi et al. | 346/157 |
| 4,978,849 | 12/1990 | Goddard et al. | 346/108 X |
| 5,040,003 | 8/1991 | Willis | 346/157 |
| 5,072,244 | 12/1991 | Aoki et al. | 346/160 |
| 5,175,570 | 12/1992 | Haneda et al. | 346/160 |

*Primary Examiner*—Benjamin R. Fuller
*Assistant Examiner*—Randy W. Gibson

[57] ABSTRACT

An imaging system is provided for transverse registration of image exposures on photoreceptive belts subject to lateral deviation from linear travel in which a narrow rectangular slit in cooperation with a linear position sensor is used for the detection of lateral belt displacement and circuitry means are provided to generate corrective steering signals to either return the belt to a laterally registered position or to modify the drive input to the particular imager being used to re-register the start-of-scan of the image exposure frames.

5 Claims, 3 Drawing Sheets

TRANSVERSE IMAGE REGISTRATION FOR A DIGITAL COLOR PRINTER

This is a continuation of application Ser. No. 07/995,650, filed Dec. 18, 1992.

BACKGROUND OF THE INVENTION

The present invention relates to registration of plural image exposures in a digital color printer and, more particularly, to transverse registration of images formed by exposure to transverse line scanning on a longitudinally moving photoreceptor belt subject to lateral deviation from linear travel.

DESCRIPTION OF THE RELATED ART

In digital methods for providing color images by xerography, each image area on a photoreceptive belt must make at least four passes relative to a transverse line scan by a modulated laser beam or a linear array of light emitting diodes and registered to within a 0.1 millimeter circle or within a tolerance of ±0.05 mm. The use of timing marks spaced longitudinally on the belt in correspondence with the image areas, coupled with available electronic sensors and associated circuitry, has enabled longitudinal registration of the image areas, or registration in the process direction of belt travel, acceptably within this degree of precision. Registration of image elements or "pixels" in a transverse direction, or in a direction perpendicular to the direction of belt travel, has been more difficult to attain due to manufacturing tolerances in belt width, supporting roller geometry, uneven belt stretch or a combination of such tolerances.

In the past, the problems associated with transverse or cross-process registration of pixels in multiple exposures of images on photoreceptive belts have been addressed either by attempts to guide the belt in a manner to avoid or at least reduce lateral shifting, or by corrective steering of the belt in response to sensed lateral deviation from true linear travel. Belt steering techniques previously employed have most commonly relied on belt edge sensors to detect lateral shifting of the belt and to control a mechanical steering mechanism for returning it to the correct line of travel. Such belt steering systems are subject to inaccuracy resulting from belt width tolerances and edge waviness and also require a mechanical steering mechanism which requires a substantial measure of belt travel and time before the electrically sensed belt shifting can be accomplished.

An improved belt steering technique is set forth in co-pending application, U.S. Ser. No. 07/635,835, filed on Jan. 3, 1991 and assigned to the same assignee as the present invention. In this application, whose contents are hereby incorporated by reference, there is disclosed a transverse belt registration mechanism which includes the detection of target patterns which have been formed as apertures in the photoreceptor belt, each target preceding an associated image exposure frame. The targets assume a variety of patterns in that application, but have in common the formation in the belt of at least a reference target line and a target line inclined, with respect to the direction of belt travel, so that the duration of time between passage of the target lines with respect to a spatially fixed sensing axis varied with lateral displacement of the belt. One exemplary target pattern, shown in FIG. 5 of the said co-pending application, is to form a "Z" shaped pattern of two transverse and one inclined slot. This embodiment has been found to produce satisfactory output signals from the associated sensor assembly allowing more precise control of image placement on the belt surface.

One practical problem with the "Z" shaped pattern, however, is that the transverse slots, which are formed by cutting slots into the inboard or outboard end of the belt, tend to curl upwards, due to stresses produced on the slots as they are driven around the photoreceptor drive rollers, drive end, or idler rollers. The slot edges being perpendicular to the belt travel (process) direction tend to curl upwards. The upward curls result in protrusions above the belt surface, which may be caught and damaged by the sensor, which is normally located proximate to the belt surface. The curled edge also appears "wave-like" to the sensor, resulting in depth of field sensing errors. A further problem is that the "Z" shaped pattern tends to fracture or tear, due to the cyclic bending stress and concentration at the corners of the transverse slots. Co-pending application, U.S. Ser. No. 07/859,746, filed on Mar. 30, 1992 and assigned to the same assignee as the present invention, provided an improved form of the Z-shaped pattern, but which did not completely eliminate these problems.

It is, therefore, an object of the present invention to improve lateral registration sensing in a color digital printer. According to the invention, the Z-shaped pattern disclosed in the prior art is replaced by a single, narrow slit formed in an opaque strip at the edge of the belt with the longitudinal dimension parallel to the process direction of the belt. Light passing through this narrow slit from a fixed light source is sensed along the length of a linear position sensor. The analog output of the sensor is then processed to provide a lateral registration signal, which corresponds to the sense of lateral misregistration. Corrective signals are then applied to either the particular imager forming the image, or to a belt steering circuit, which moves the belt laterally to the initially established correct registration position. More particularly, the present invention relates to a color printer for forming a composite image by successive exposures of image exposure frames on a photoconductive member moving in a process direction including:

a photoreceptor belt which accommodates the formation of an integral number of image exposure frames, said belt having at least a narrow rectangular slit with its length aligned in the process direction, said slit formed in an opaque area of the belt outside of the image exposure area, detecting means associated with said slit for detecting changes in the transverse position of said slit, and registration circuit means for generating signals for adjusting transverse location of said exposure frames in relation to the detected transverse position of said slit.

Other relevant prior art disclosures are found in the following co-pending applications, all assigned to the same assignee as the present invention. These applications, as well as the referenced patent, are hereby incorporated by reference.

Application Ser. No. 07/807,931, filed on Dec. 16, 1991, discloses process direction and lateral registration of image print bars used as imagers in a digital color printer.

Application Ser. No. 07/807,921, filed on Dec. 16, 1991, discloses process direction and lateral registration of Raster Output Scanners used as imagers in a digital color printer.

Application Ser. No. 07/931,802, filed on Aug. 18, 1992, discloses an image bar recording system which established lateral registration by separate energization and detection of pixels of the image bars used.

U.S. Pat. No. 4,961,089 discloses an apparatus and method for photoreceptor web tracking. The tracking system controls the guiding device which aligns the photoreceptor to minimize misregistration of the developed images. The algorithms predict when the motion of the photoreceptor will be beyond a predetermined allowable limit and corrects in advance of that transition.

DESCRIPTION OF THE INVENTION

Figure 1:
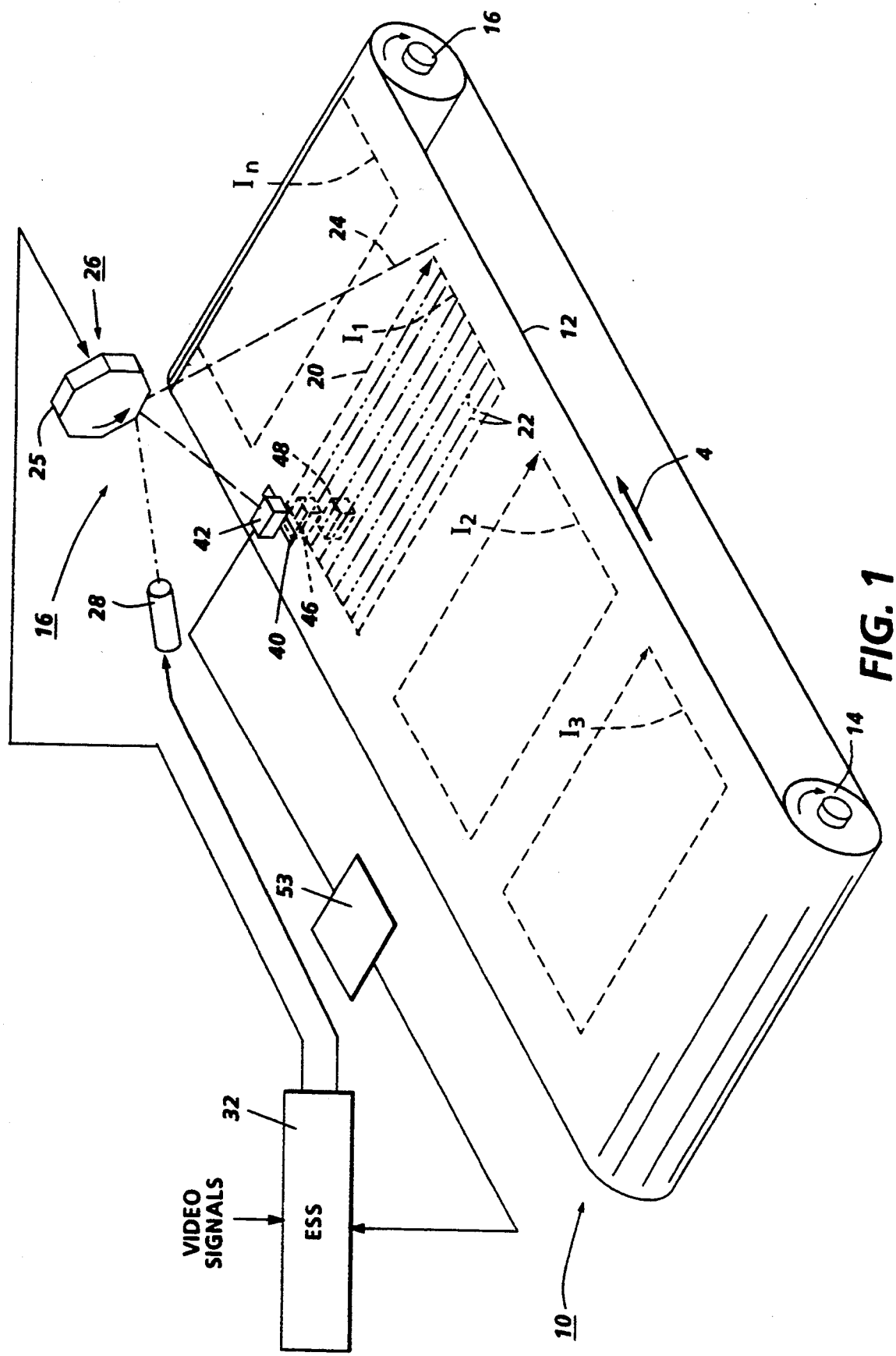
FIG. 1 is a schematic perspective view illustrating a system incorporating the invention and for providing multiple exposures on a photoreceptive belt by multiple passes of image areas on the belt in relation to a single raster output scanner.

In FIG. 1 of the drawings, an embodiment of the present invention is incorporated in a multi-pass xerographic printing system depicted schematically and designated generally by reference numeral 10. The system 10 includes a photoreceptive belt 12 trained about guide rollers 14 and 16, at least one of which is driven to advance the belt 12 in a longitudinal (process) direction depicted by the arrow 4. The length of the belt 12 is designed to accept an integral number of spaced image areas $I_1$-$I_n$ represented by dashed line rectangles in FIG. 1. As each of the image areas $I_1$-$I_n$ reaches a transverse line of scan, represented by a dashed arrow 20, it is progressively exposed on closely spaced transverse raster lines 22 shown with exaggerated longitudinal spacing on the image area $I_1$ in FIG. 1.

In the embodiment depicted in FIG. 1, the line 20 is exposed by a ROS (raster output scanner). A modulated laser beam 24 is reflected to the line 20 by a facet 25 on a rotatable polygon-shaped mirror 26. Successive facets expose additional lines. The beam 24 is emitted by a laser device 28 such as a laser diode, controlled by drive signals from an Electronic Sub System (ESS) 32. ESS 32 includes other circuit or logic modules and includes a scanner drive command circuit which operates a motor (not shown) for rotating the polygon mirror 26 at a controlled speed. It is understood that linear print bars such as LED print bars could be used as the imager, instead of the ROS with appropriate changes in drive circuitry, as is known to those skilled in the art.

In the operation of the system 10, as thus far described, ESS 32 responds to video data signals to expose each raster line 22 to a linear segment of the video signal image. In xerographic color systems, each image area $I_1$-$I_3$, must be exposed in the same manner to successive exposures, one for each of the three basic colors. A fourth image area (black) can be used for a full process color system. In a multi-pass system such as the system 10, where only one raster output scanner or imager is used, complete exposure of each image area requires three revolutions of the belt 12. As is known in the art, a single pass system would expose each image area successively by three raster output scanners each including its own polygon mirror. Co-pending application, U.S. Ser. No. 07/807,927, referenced supra, discloses a four station ROS single pass full color system. Continuing with the description of FIG. 1, the image areas, $I_1$-$I_n$ are successively exposed on successive raster lines 22 as each raster line registers with a transverse scan line 20 as a result of longitudinal movement of belt 12.

It is to be noted that the length of the transverse scan line 20 or transverse scan lines 22 are longer than the transverse dimension of the image areas. Scan line length, in this respect, is determined by the length of each mirror facet 25 and exceeds the length of the raster lines 22. The length of each raster line is determined by the time during which the laser diode is active to reflect a modulated beam from each facet 25 on the rotating polygon 26 as determined by the signals from ESS 32. Thus, the active portion of each transverse scan line may be shifted in a transverse direction by control of the laser drive module and the transverse position of the exposed raster lines 22, and image areas $I_1$-$I_n$ shifted in relation to the belt 12.

In accordance with the present invention, signals indicating deviation of belt travel from a straight line are generated and used to determine the precise transverse location of the first of successive image exposures in relation to the photoreceptor belt and to either adjust the active write portion of each transverse scan line 20 for each succeeding image as needed to assure precise transverse registration or to steer the belt back into a laterally registered position. This operation is achieved by the provision of a slit 40 of narrow width having its longitudinal dimension extending in a direction parallel to the process direction of the belt. The slit will be described in more detail below with reference to FIGS. 2 and 3. The slit is located along an edge of the belt 12, outside of the image area and in an opaque area. A photodiode sensor 48 is located to be periodically aligned with the slit.

Figure 2:
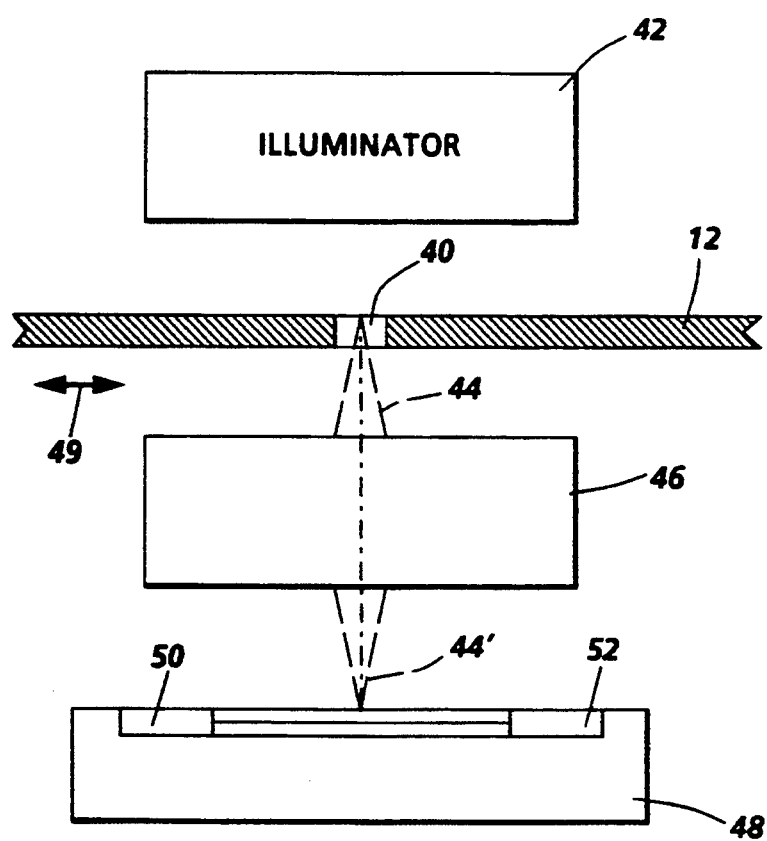
FIG. 2 shows an end view of the system of FIG. 1 with the process direction of the photoreceptor belt into the page and with the belt motion shown by the arrow.

Referring to FIGS. 1 and 2, slit 40 is formed in the surface of belt 12 outside the image area in an opaque area of the belt. A linear illuminator 42 is positioned above the belt to emit a beam 44 of light downward towards the belt. As belt 12 moves in the process direction, the slit passes into view of the beam 44. The beam 44 passes through the slit, is transmitted by a linear gradient index lens array 46 and the image of the slit is focused as beam 44' onto the surface of photodiode sensor 48. Illuminator 42, lens 46 and sensor 48 are aligned parallel to a common sensing axis which is perpendicular to the slit length. It is noted that if the sensor 48 can be mounted in close proximity to the belt, the lens array 46 can be omitted. Further modifications, which may be understood by those skilled in the art are to reverse the position of the illuminator 42 and sensor 48 so that they are adjacent the opposite sides of the belt in a new alignment. Sensor 48, in the preferred embodiment, is a single axis linear position sensor (UDT PIN-SL5-2) having a pair of two top electrodes 50 and 52 disposed at each end. Upon initial lateral registration alignment, the slit 40 is positioned so that it's image is on the center portion of the sensor and, therefore, the analog signal generated by the sensor will be zero. However, with continued operation, the belt may move laterally, left or right, beyond the preselected laterally registered position. The image of the slit in the direction of arrow 49 (FIG. 2) will then begin to be sensed in the following manner. As the image of slit 40 travels along the length of sensor 48, electron-hole pairs are produced and travel to either of the two electrodes 50, 52. If the image of the slit is located closer to one electrode than the other, then the closer electrode generates a proportionally larger current. By differentially detecting the currents at the two electrodes, in registration circuit 53, the position of the slit, and hence the relative movement of the belt, are calculated.

Figure 3:
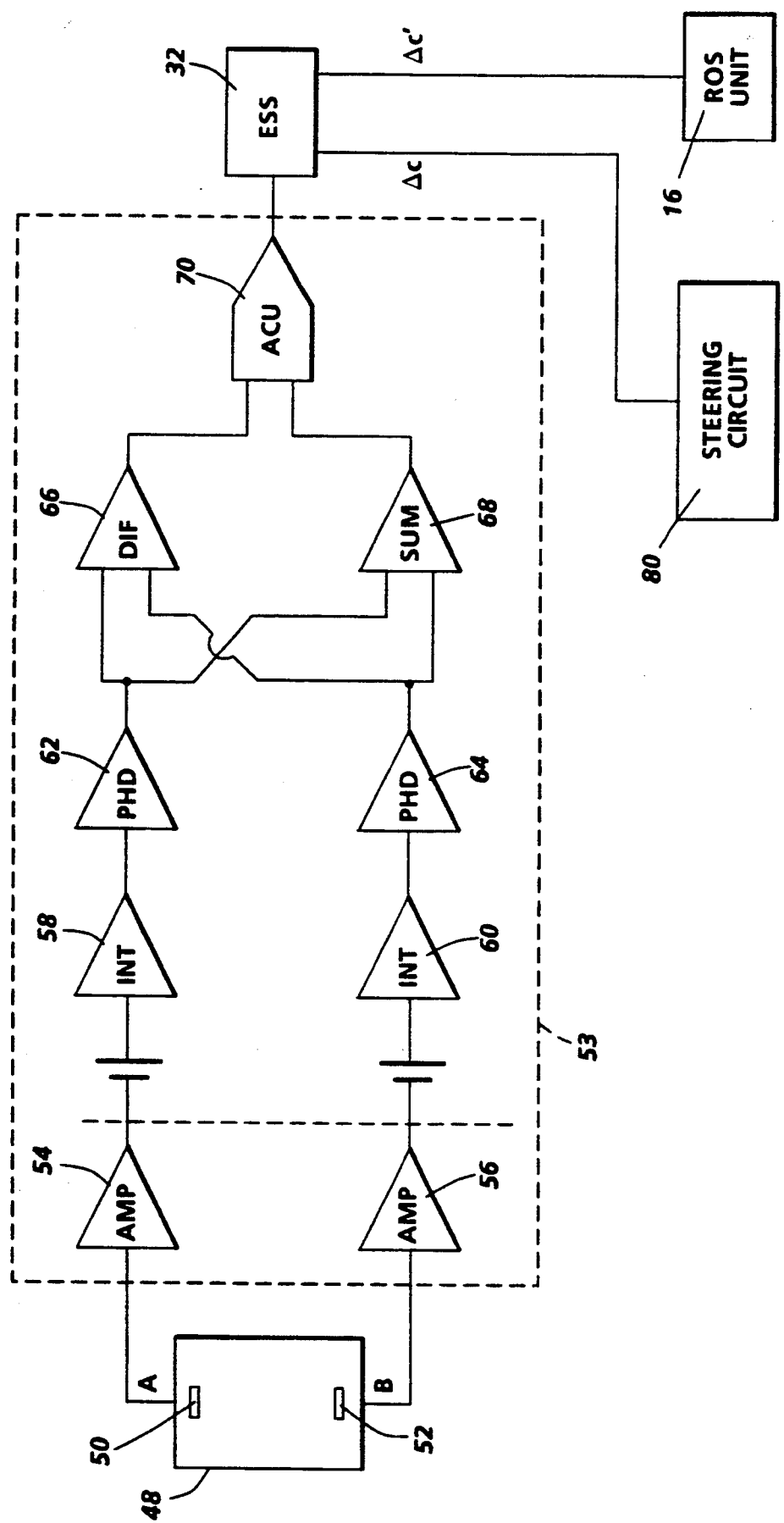
FIG. 3 is a block diagram of feedback control circuitry for correcting lateral misregistration of the belt.

As shown in FIG. 3, the sensor 48 will produce lateral registration error output signals A and B, depending upon the current detected at the two electrodes. Also, sensor 48 can be reversed-biased, as is known in the art, in order to improve both the carrier efficiency and the response time. As shown, circuit 53 includes operational amplifiers 54, 56, which amplify signals A or B and then integrate the signals in integrators 58, 60. The use of the integrators significantly increases the signal-to-noise ratio (S/N) of the system, enabling the sensors to be used in the noisy environment of a printing system employing high-voltage xerographic charging and development subsystems. Similarly, the integrators permit the use of slower, less expensive, photodiodes as well. The peak height detectors (PHDs), 62, 64 have active feedback for high-speed operation and are employed in the circuit to capture the output from integrators 58, 60. Subsequently, the outputs of PHDs 62, 64 are used to drive the summing (SUM) and difference (DIF) amplifiers 68 and 66. The output of summing amplifier 68 is a measure of the total flux applied to the sensor 48 by the incident light beam 44, while the output of the difference amplifier 66 is a function of the difference in the number of carriers collected at each of the electrodes. The last component of the circuit is arithmetic computation unit (ACU) 70, which is configured to output a value that is ten times the ratio of the difference amplifier output divided by the summing amplifier output. Subsequently, the output of ACU 70 is converted using an analog-to-digital converter (not shown) and passed to ESS 32, where the signal is interpreted to determine whether a beam steering adjustment is necessary to bring the ROS beam into a proper position or, alternatively, whether a belt steering adjustment is necessary to move the belt laterally back to the pre-established correct registration. In either case, appropriate correction signals, $\Delta c$, $\Delta c'$ are sent to either ROS unit 16 or belt 12 steering circuit 80.

Since the sensors locate the center of the illuminated area, there is latitude in choosing the width of the slit. Experiments have shown that widths of slit 40, up to 1 mm, are feasible to maintain the required accuracy. Lateral position resolution will be primarily a function of the illuminating source 42 and the signal resolving circuitry shown in FIG. 3.

While the invention has been described with reference to the structures disclosed, it is not confined to the details set forth, but is intended to cover such modifications or changes as they come within the scope of the following claims. For example, the invention could be used with more than one belt slit formed in the opaque edge belt area for greater precision. Also, the invention could be practiced in either a single pass system wherein a plurality of imagers, ROS or image bars, could be used.

What is claimed is:

1. A color printer for forming a composite image by successive exposures of image exposure frames on a photoconductive member moving in a process direction, the printer including:

a photoreceptor belt having at least a narrow rectangular slit with a length in a process direction and a width in a transverse direction, said slit formed in an opaque area of the belt outside of the image exposure frames, said belt having two opposed surfaces, detecting means associated with said slit for detecting changes in the transverse position of said slit said detecting means including a light source fixedly positioned adjacent one surface of the belt and a linear position sensor positioned adjacent an opposed surface of the belt, having a pair of electrodes on a top surface thereof, said light source and sensor aligned along a common optical axis and wherein said light source produces an image of said slit which is incident on said sensor when said slit passes between said light source and said sensor, and registration circuit means for generating signals for adjusting transverse location of said exposure frames in relation to the detected transverse position of said slit.

2. The printer of claim 1 further including registration circuit means for generating transverse registration correction signals, said circuit means including means for differentially detecting and comparing the currents at said electrodes.

3. The printer of claim 1 further including at least one Raster Output Scanning (ROS) means for forming said image exposure frames.

4. The printer of claim 1 further including at least one linear print bar imager for forming said image exposure frames.

5. The printer of claim 1 wherein said linear position sensor pair of electrodes are separated by a central sensing portion and wherein said slit image initially sensed in the center of said central sensing portion and at a point midway between, and not incident on, said electrodes and wherein said registration circuit means generates signals for adjusting transverse location when said slit image is sensed at a position other than at a point midway between said electrodes.

* * * * *